(12) United States Patent
Moosavi

(10) Patent No.: US 8,135,892 B2
(45) Date of Patent: *Mar. 13, 2012

(54) METHOD AND APPARATUS FOR TRANSFERRING DATA BETWEEN USB CLIENT DEVICES BY TOGGLING A USB $V_{BUS}$ LINE

(75) Inventor: Vahid Moosavi, Kitchener (CA)

(73) Assignee: Research In Motion Limited, Waterloo, ON ( * ) Notice: Subject to any disclaimer, the term of this patent is extended or adjusted under 35 U.S.C. 154(b) by 0 days.

This patent is subject to a terminal disclaimer.

(21) Appl. No.: 12/985,065

(22) Filed: Jan. 5, 2011

(65) Prior Publication Data

US 2011/0106988 A1 May 5, 2011

Related U.S. Application Data

(63) Continuation of application No. 11/341,661, filed on Jan. 30, 2006, now Pat. No. 7,882,288.

(51) Int. Cl.
*G06F 13/42* (2006.01)
(52) U.S. Cl. ......... 710/106; 710/313
(58) Field of Classification Search .......... 710/300–306, 710/313–315, 62–64, 72, 8–19, 104–110; 713/310, 323, 330–340
See application file for complete search history.

(56) References Cited

U.S. PATENT DOCUMENTS

| | | | |
|---|---|---|---|
| 4,520,488 A | 5/1985 | Houvig et al. | |
| 5,148,144 A | 9/1992 | Sutterlin et al. | |
| 6,308,215 B1 | 10/2001 | Kolbet et al. | |
| 6,415,342 B1 | 7/2002 | Wahl et al. | |
| 6,668,296 B1 | 12/2003 | Dougherty et al. | |
| 6,963,933 B2 | 11/2005 | Saito et al. | |
| 7,082,545 B2 | 7/2006 | Kubo et al. | |
| 7,170,259 B2 | 1/2007 | Veselic | |
| 7,174,408 B2 | 2/2007 | Ede | |
| 7,266,625 B2 | 9/2007 | Sakaki et al. | |
| 7,268,561 B2 | 9/2007 | Zhu | |
| 7,413,129 B2 | 8/2008 | Fruhauf | |
| 7,882,288 B2 * | 2/2011 | Moosavi ........ | 710/106 |
| 2002/0062456 A1 | 5/2002 | Mariaud et al. | |
| 2003/0002395 A1 | 1/2003 | Chang et al. | |
| 2004/0155966 A1 | 8/2004 | Jang et al. | |
| 2004/0186926 A1 | 9/2004 | Rapaich | |
| 2005/0114580 A1 * | 5/2005 | Ede ............ | 710/305 |
| 2005/0138446 A1 | 6/2005 | Matsuda | |
| 2006/0076977 A1 | 4/2006 | Zhu | |
| 2007/0180174 A1 | 8/2007 | Moosavi | |

FOREIGN PATENT DOCUMENTS

EP 1248203 10/2002
EP 1816571 B1 7/2008

* cited by examiner

*Primary Examiner* — Raymond Phan
(74) *Attorney, Agent, or Firm* — Moffat & Co.

(57) ABSTRACT

A method and apparatus for transferring data from a first electronic device to a second electronic device, both first and second electronic devices having Universal Serial Bus (USB) client interfaces, the method comprising the steps: connecting the two electronic devices with a USB cable; toggling the voltage on a $V_{BUS}$ line of the USB cable between logic high voltage and no voltage at the first electronic device; detecting toggles of the $V_{BUS}$ line at the second electronic device; and interpreting the toggles detected in the detecting step as data.

17 Claims, 2 Drawing Sheets

METHOD AND APPARATUS FOR TRANSFERRING DATA BETWEEN USB CLIENT DEVICES BY TOGGLING A USB $V_{BUS}$ LINE

RELATED APPLICATIONS

The present disclosure is a continuation of U.S. patent application Ser. No. 11/341,661, filed Jan. 30, 2006, the entire contents of which are incorporated herein by reference.

FIELD OF THE APPLICATION

The technology described in this patent application relates generally to communication between electronic devices. More particularly, the application concerns a system for sending data to a Universal Serial Bus (USB) client.

BACKGROUND

USB is a standardized serial bus interface for connecting a host device such as a personal computer to a peripheral devise such as a mouse and a keyboard. At present, USB is mounted in almost all personal computers and these can be connected to any peripheral device having a USB terminal.

The USB standard uses a master-servant protocol. Devices communicating through a USB connection have a master-servant relationship, where 'host' devices are masters and 'client' devices are servants. A host device can only exchange data with a client device and vice-versa. Besides a data line, the USB standard also features a power supply line called a '$V_{BUS}$ line'. Via the $V_{BUS}$ line, the host supplies power to the client.

It is impossible to directly connect one client device with another client through a USB connection. In order to send data to a USB client, it is necessary that the sending device be either a USB host or a USB OTG device. An OTG device can operate as a host or a client. A device operating as a USB host requires substantially more energy and processing power relative to a USB client. It is also expensive and time consuming to develop and integrate a USB host capacity into a device. This is especially true when only a small amount of data needs to be transferred.

For some applications, where only a few bits of data need to be transferred between two USB client devices, it does not make sense to incorporate a USB host capacity into a sending device.

BRIEF DESCRIPTION OF THE DRAWINGS

The present application will be better understood with reference to the drawings, in which.

DETAILED DESCRIPTION

The present method and apparatus overcome the deficiencies of the prior art by providing a system for transferring small amounts of data from a device that is not a USB host or a USB OTG device to a USB client via a USB connection. In one embodiment, the size limit for data is 512 bits. This is however not meant to be limiting, and other data sizes are contemplated to be within the scope of the present method and system.

The above is achieved by a system comprising a sending device and a USB client device connected with a USB cable. When a user needs to send data, the sending device transmits data by toggling the voltage on the $V_{BUS}$ line of the USB connection. The toggling of the $V_{BUS}$ line produces connect/disconnect interrupts in the USB client device. The interruption handler of the USB client device handles said interrupts. A module on the USB client device monitors the interruption handler. The module identifies the interrupts, which represent data, and receives said data. The data can be received by simply counting the interrupts, or by using a coding scheme to reduce the number of toggles necessary to transmit the data.

The present application therefore provides a method for transferring data from a first electronic device to a second electronic device, both first and second electronic devices having Universal Serial Bus (USB) client interfaces, the method comprising the steps: connecting the two electronic devices with a USB cable; toggling the voltage on a $V_{BUS}$ line of the USB cable between logic high voltage and no voltage at the first electronic device; detecting toggles of the $V_{BUS}$ line at the second electronic device; and interpreting the toggles detected in said detecting step as data.

The present application further provides a USB client apparatus adapted to communicate with a second USB client apparatus, the USB client apparatus comprising: a USB port; and means for toggling a $V_{BUS}$ line on said USB port.

The present application still further provides a USB client apparatus adapted to communicate with a second USB client apparatus, the USB client apparatus comprising: a USB port; means for detecting toggling of a $V_{BUS}$ line on said USB port; and means for interpreting said toggling into data content.

Figure 1:
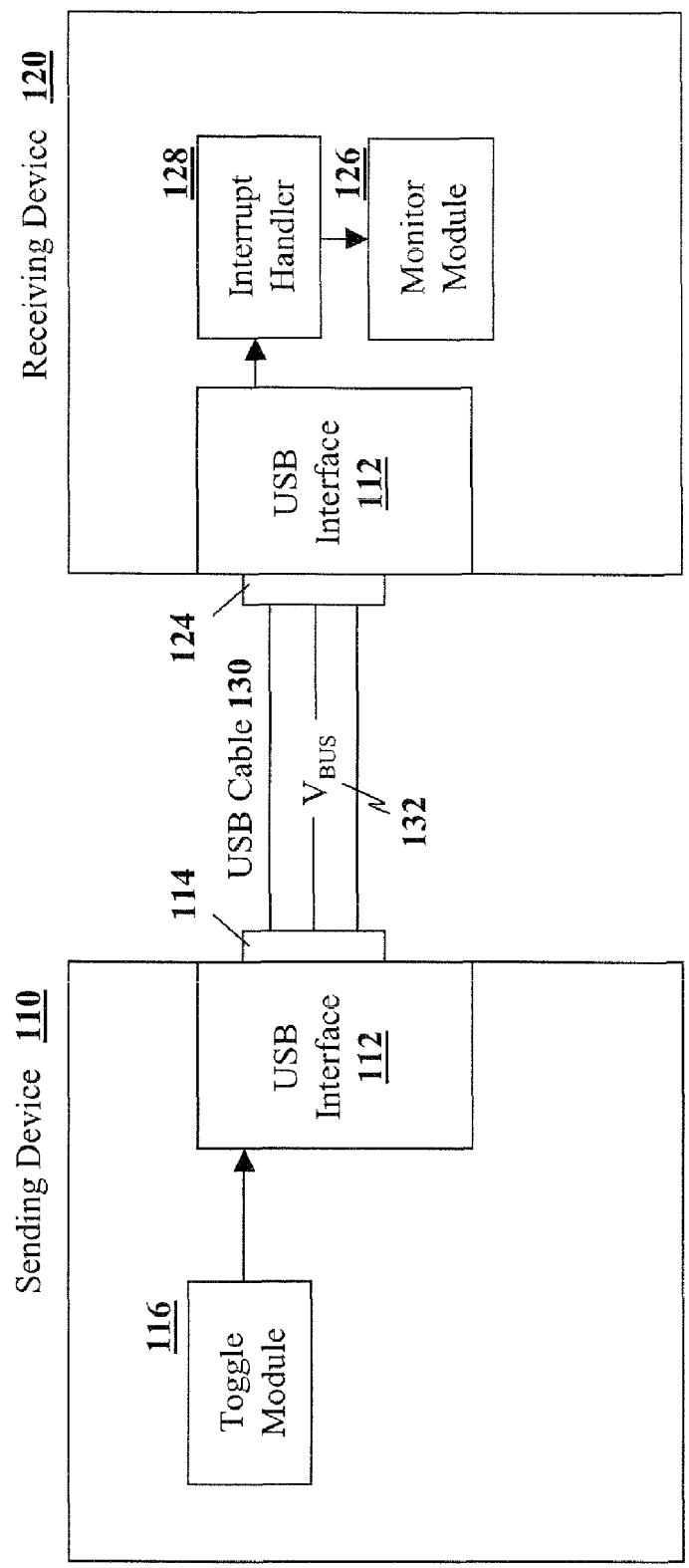
FIG. 1 is a schematic diagram of a USB client electronic device connected to a second electronic device with a USB cable.

Reference is now made to FIG. 1. FIG. 1 is a schematic diagram of two devices, referred to herein as sending device 110 and receiving device 120 which are connected to each other through a USB cable 130.

Sending device 110 includes a USB interface 112 and a USB port 114.

As will be appreciated by those skilled in the art, USB cable 130 includes four separate lines. These include a $V_{BUS}$ line 132 and a ground line and two data lines (not explicitly shown in FIG. 1. The present application utilizes the $V_{BUS}$ line.

The $V_{BUS}$ line 132 provides an indication of connection between the USB host and client in a typical USB application. The $V_{BUS}$ line provides a logic high voltage of between 4.75 and 5.25 volts when a connection is made, and as will be appreciated by those skilled in the art, 0 volts when there is no connection.

According to the present method and apparatus, the sending device 110 includes a means for toggling the $V_{BUS}$ line. This is referred to herein as toggle module 116.

Further, receiving device 120 includes a USB interface 122 and a USB port 124. According to the present method and apparatus, the receiver further comprises a means for monitoring the $V_{BUS}$ line, referred to herein as the monitor module 126. Further, an interrupt handler 128 is adapted to cause an interrupt when it detects the toggling of the $V_{BUS}$ line.

In order to communicate between the sending device 110 and receiving device 120 without having to have USB interface 112 or 124 become a host interface, the present method and device provide for the toggling of the $V_{BUS}$ line 132 to provide communications.

Sending device 110 uses toggle module 116 to provide information by toggling $V_{BUS}$ line 132, which is received at receiver 120 and interrupt handler 128. Monitor module 126 counts the number of times that a toggle occurs, and this can be the data that is transferred. Alternatives could include coding for bits using various timing between toggles, as explained in more detail below.

The above will be better understood with reference to a specific example. The example below is not meant to be limiting, but is merely meant to illustrate the above method and device.

In a practical operation, a smart card reader can be connected wirelessly to a mobile data device in order to provide functionality for the smart card reader. However, before the smart card reader is capable of communicating with the mobile data device, both need to have a personal identification number synchronized between the two. In one embodiment, the Bluetooth™ smart card reader generates a pin number that needs to be entered into the mobile data device. In order for the communication to be secure, the pin code needs to be relatively long.

One option for doing the above is to enter the pin code manually into the mobile data device. However, this is a problematic approach, since it is possible, and even likely when entering long pin codes, to make errors in the data entry. Further, the typing in of pin codes on a device is not considered to be very secure because of the possibility that an attacker can watch the entry of the pin code and then emulate it on his or her own data device.

As an alternative, the wireless accessory such as the Bluetooth™ smart card reader can be connected to the mobile data device with a USB cable 130 for the temporary transfer of the pin. However, this previously required that either the mobile data device or the Bluetooth™ smart card reader needed to be a USB host or an On-the-Go (OTG) device. From both a hardware and software perspective this is overkill since the pin exchange application typically only exchanges a few bits, for example 512 bits, and the excess hardware and software required to have a USB host is prohibitive in terms of cost and development time.

Utilizing the above method, the present application provides for a mobile data device and a Bluetooth™ smart card reader that each include USB clients and are capable of communicating with one another. Specifically, the smart card reader includes means for toggling $V_{BUS}$ line 132 on USB 130 between logic high and an open circuit. As will be appreciated by those skilled in the art, logic high indicates to the device that the cable is connected and an open circuit indicates that a cable is disconnected. If the toggling is fast enough, the device will realize that a user is not plugging in and removing the USB from USB interface, but rather a toggling operation is occurring.

On the mobile data device an interrupt handler 128 can be used to detect and receive data.

In operation, the two devices are connected together with the USB cable 130. A hand shaking routine or some other sort of a routine can occur to indicate that the Bluetooth™ smart card reader is ready to transmit data to the mobile data device. Alternatively, transmission could occur after the connection has stabilized without any header information.

In order to communicate, the Bluetooth™ smart card reader can toggle the $V_{BUS}$ line on and off in a regular pattern and the mobile data device can count the number of times that the toggle occurs. This fixed count can then be used as the pin for further wireless communications between the Bluetooth™ smart card reader and the mobile data device.

In an alternative embodiment, the toggling can be done to represent bits. Specifically in this case the toggling is done on a regular pattern and a low signal for a specific amount of time can represent a number of zero bits in a row.

A further option is to break the pin code into bytes, or 8 bits. In a preferred embodiment, the device can toggle up to four times per second (or 2 bits of data per second). Thus each byte will take 4 seconds to transmit.

Other types of encoding for communication through the toggling of the bus line will be known to those skilled in the art and are contemplated to be part of the present application.

As indicated above, the example with the Bluetooth™ smart card reader and the mobile data device is merely meant as an example. Communications between other devices is contemplated within the scope of the present application. The present application is not limited to mobile devices, but could include any device that has a USB client but not a USB host.

Further, the above representation regarding FIG. 1 and the specific example of a Bluetooth smart card reader communicating with a mobile data device only discuss communication between a sending device 110 and a receiving device 120. However, the present application further contemplates the receiving device becoming a sending device and vice versa, thereby having half-duplex communication. In this case, each of the receiving device and sending device will have a toggle module 116, an interrupt handler 128 and a monitor module 126, thereby becoming both sending and receiving devices. As will be appreciated by those skilled in the art, since there is only one $V_{BUS}$ line 132, communication will only be from one device at a time.

Figure 2:
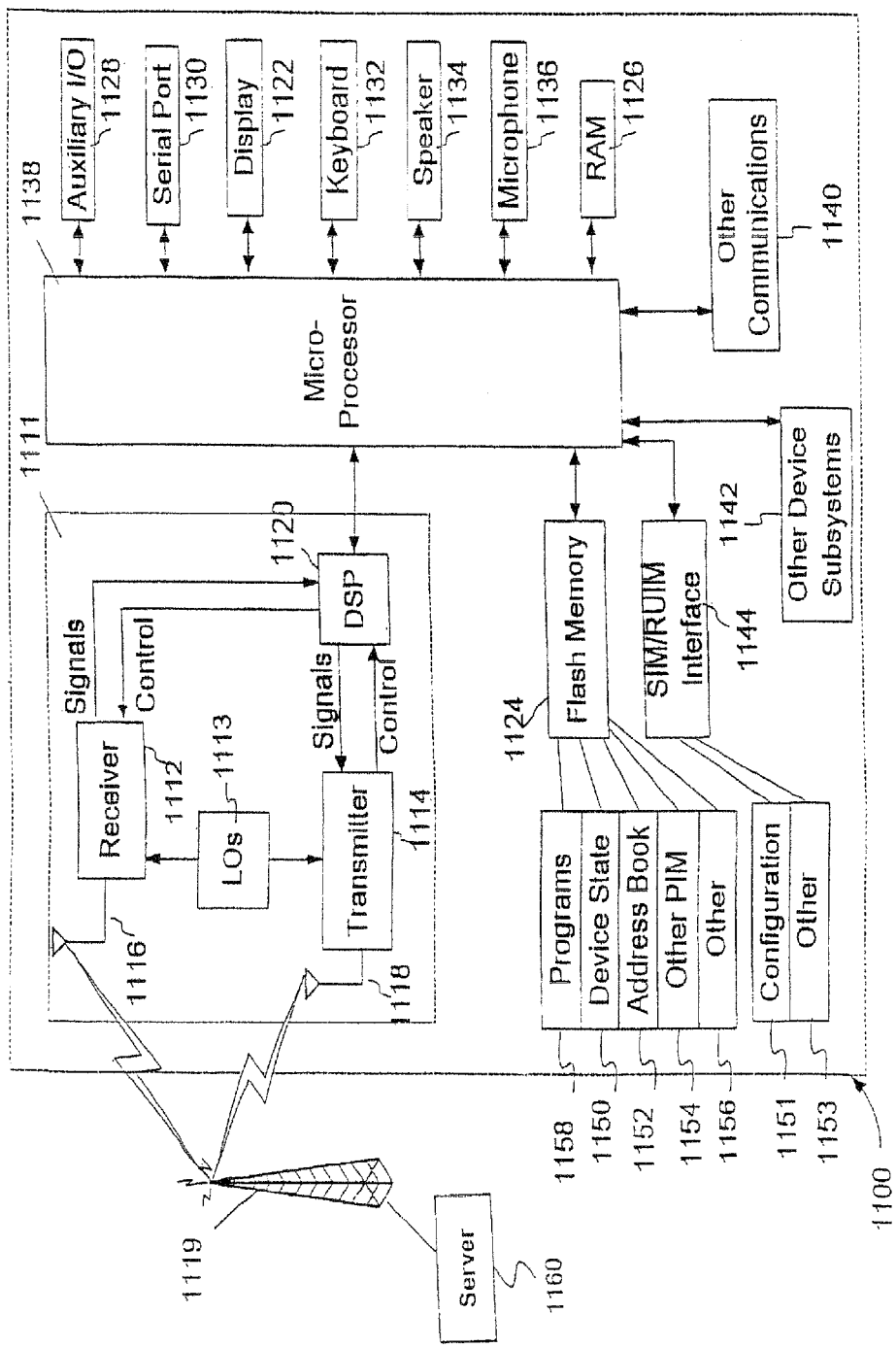
FIG. 2 is an exemplary mobile device that can be used in association with the above method.

If a mobile device is used, an exemplary mobile device that can be used is described with relation to FIG. 2. Reference is now made to FIG. 2.

One skilled in the art will appreciate that many mobile devices could be used to implement the above. FIG. 2 illustrates an exemplary mobile device that could be used with the above method and system. Mobile device 1100 is preferably a two-way wireless communication device having at least voice and data communication capabilities. Mobile device 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile device 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile device 1100 is registered on the network using a unique identification number associated with each mobile device. In UMTS and GPRS networks, and in some CDMA networks, however, network access is associated with a subscriber or user of mobile device 1100. A GPRS mobile device therefore requires a subscriber identity module (SIM) card in order to operate on a GPRS network, and a Removable User Identity Module (RUIM) in order to operate on some CDMA networks. Without a valid SIM/RUIM card, a GPRS/UMTS/CDMA mobile device may not be fully functional. Local or non-network communication functions, as well as legally required functions (if any) such as emergency calling, may be available, but mobile device 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile device 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 2, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a Web client system in order to accommodate various clients with various service levels.

Mobile device 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 2 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile device. A predetermined set of applications that control basic operations, including at least data and voice communication applications for example, will normally be installed on mobile device 1100 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile device 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile device 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile device 1100 is similar, except that received signals would preferably be output to a speaker 1134 and signals for transmission would be generated by a microphone 1136. Alternative voice or audio I/O subsystems, such as a voice message recording subsystem, may also be implemented on mobile device 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 2 would normally be implemented in a personal digital assistant (PDA)-type mobile device for which synchronization with a user's desktop computer (not shown) may be desirable. Such a port 1130 would enable a user to set preferences through an external device or software application and would extend the capabilities of mobile device 1100 by providing for information or software downloads to mobile device 1100 other than through a wireless communication network. The alternate download path may for example be used to load an encryption key onto the device through a direct and thus reliable and trusted connection to thereby enable secure device communication.

Alternatively, serial port 1130 could be used for other communications, and could include as a Universal Serial Bus (USB) port. An interface is associated with serial port 1130.

Other communications subsystems 1140, such as a short-range communications subsystem, is a further optional component which may provide for communication between mobile device 1100 and different systems or devices, which need not necessarily be similar devices. For example, the subsystem 1140 may include an infrared device and associated circuits and components or a Bluetooth™ communication module to provide for communication with similarly enabled systems and devices.

According to FIG. 2, an interrupt handler, toggle module and monitor module could be software stored in Flash Memory 1124 and run by microprocessor 1138.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for sending data from a first electronic device to a second electronic device, both first and second electronic devices having Universal Serial Bus (USB) client interfaces and the first and second electronic devices being connected with a USB cable, the method comprising the steps:

encoding data to be communicated to said second electronic device in a toggling pattern;

toggling in accordance with said pattern the voltage on a $V_{BUS}$ line of the USB cable between logic high voltage and no voltage at the first electronic device, wherein said toggling results in said data being sent from the first electronic device.

2. The method of claim 1, wherein said data being sent is represented by a number of toggles.

3. The method of claim 1, wherein said data being sent is represented as number of toggles in a predetermined time period.

4. The method of claim 1, wherein said data being sent transfers bits by providing a high voltage to represent a binary one and no voltage to represent a binary zero in a specific time slot.

5. The method of claim 1, further comprising a handshaking routine to indicate a start of data transmission.

6. The method of claim 1, wherein the $V_{BUS}$ line is toggled at rate four toggles per second or greater.

7. The method of claim 1, wherein the amount of data being transferred is 512 bits or less.

8. The method of claim 1, wherein the first electronic device is a mobile data device.

9. A method for receiving data at a second electronic device from a first electronic device, both first and second electronic devices having Universal Serial Bus (USB) client interfaces and the first and second electronic devices being connected with a USB cable, the method comprising the steps:

detecting toggles of the $V_{BUS}$ line at the second electronic device, the toggles encoding data communicated from said first electronic device; and interpreting the pattern of toggles detected in said detecting step as data.

10. The method of claim 9, wherein said interpreting step counts the number of toggles.

11. The method of claim 9, wherein said interpreting step counts the number of toggles in a predetermined time period.

12. The method of claim 9, wherein said interpreting step can transfer bits by providing a high voltage to represent a binary one and no voltage to represent a binary zero in a specific time slot.

13. The method of claim 9, wherein said detecting step includes:

triggering an interrupt when a toggle occurs; and incrementing a counter upon said triggering.

14. The method of claim 9, further comprising a handshaking routine to indicate a start of data transmission.

15. The method of claim 9, wherein the $V_{Bus}$ line is toggled at rate four toggles per second or greater.

16. The method of claim 9, wherein the amount of data being transferred is 512 bits or less.

17. The method of claim 9, wherein the second electronic device is a mobile data device.

* * * * *